(12) United States Patent
Oki

(10) Patent No.: US 7,193,936 B2
(45) Date of Patent: Mar. 20, 2007

(54) WOBBLE INFORMATION DETECTION METHOD AND WOBBLE INFORMATION DETECTION APPARATUS FOR OPTICAL RECORDING MEDIUM

(75) Inventor: Tsuyoshi Oki, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 562 days.

(21) Appl. No.: 10/821,835

(22) Filed: Apr. 12, 2004

(65) Prior Publication Data

US 2004/0202079 A1   Oct. 14, 2004

(30) Foreign Application Priority Data

Apr. 14, 2003   (JP)   ............... 2003-108582

(51) Int. Cl.
   *G11B 7/005*   (2006.01)
(52) U.S. Cl. ............... 369/44.13; 369/47.48; 369/53.34
(58) Field of Classification Search .............. 369/59.2, 369/44.13, 59.21, 59.23; G11B 7/005
See application file for complete search history.

(56) References Cited

U.S. PATENT DOCUMENTS 6,208,614 B1 *   3/2001   Kim .................. 369/275.4

FOREIGN PATENT DOCUMENTS

JP      2001-209937      8/2001
JP      2002-208231      7/2002

* cited by examiner

*Primary Examiner*—A M Psitos
(74) *Attorney, Agent, or Firm*—Louis Woo

(57) ABSTRACT

A method and apparatus for detecting information recorded as a phase-modulated wobble along a track of an optical disk, whereby a reference phase section is recorded with wobble having a predetermined reference phase and whereby respective polarities of phase integration values obtained by synchronous detection of phase-modulated unit sections following the reference phase section, in a playback wobble signal, are compared with the polarity of a reference phase integration value obtained for the reference phase section, to thereby detect respective bit states expressed by the phase-modulated unit sections.

4 Claims, 9 Drawing Sheets

PRIOR ART

WOBBLE INFORMATION DETECTION METHOD AND WOBBLE INFORMATION DETECTION APPARATUS FOR OPTICAL RECORDING MEDIUM

BACKGROUND OF THE INVENTION

1. Field of Application

The operation relates to a wobble information detection method and apparatus for operating on a wobble signal that is read from an optical recording medium, which in general is an optical recording disk.

In particular, the apparatus relates to a wobble information detection method and apparatus whereby reliable detection can be achieved for information that has been recorded by phase modulation of a wobble that is formed along a track of the optical recording medium.

2. Background of the Invention

There are various standards and recording formats for playback types of optical recording medium such as a CD (compact disk), DVD (digital versatile disk), etc., and for write-once types of optical recording medium such as a CD-R (rewritable CD), DVD-R, etc., and for rewritable types of optical recording medium such as a DVD-RAM (random-access memory DVD), DVD-RW (rewritable DVD), etc.

In the case of a write-once type of optical recording disk such as a CD-R for example, as seen in the partial view of the lower side of such an optical recording disk 50 shown in FIG. 7, a track is formed along a groove 51 which wobbles laterally with a fixed periodic of variation, with that wobble-shaped groove being referred to in the following simply as the "wobble". A playback signal from an optical pick-up (not shown in the drawing) which reads data from the track also derives a signal (referred to in the following as the wobble signal) from the wobble, with that wobble signal having a specific frequency (standardized as 22.05 kHz). In the following, only playback of the wobble signal will be considered.

The wobble is recorded by being phase modulated with information such as track address information (ATIP), indicating the absolute positions of tracks. In an optical disk recording/playback apparatus (referred to in the following simply as an optical disk apparatus), an optical pick-up forms a focused light spot (indicated by numeral 52 in FIG. 7) onto a track and derives a wobble signal from the resultant reflected light. The wobble signal is then demodulated, and the aforementioned recorded information from the demodulated wobble signal is used by the optical disk apparatus in generating a disk rotation control signal during a recording or playback operation, and to generate a reference clock signal.

In the case of a DVD-R or DVD-RAM, on the other hand, the wobble does not consist of an actual shape variation of the tracks, with the wobble information instead being recorded as pits on the land side of a track. With such a method, no modulation is applied to the wobble, and the wobble signal is used to set a clock frequency (140 kHz) for disk rotation control.

Considering the wobble that is recorded by the phase modulation method, the phase is inverted to indicate respective bit states (e.g., with the 0° phase indicating the "1" bit state, and the 180° phase indicating the "0" bit state). The optical disk apparatus applies phase discrimination to the wobble signal to thereby demodulate the aforementioned recorded information.

One method of demodulation of the wobble signal is described for example in Japanese patent Laid-open No. 2002-208231 (page 2, FIG. 7). With that method, a threshold value is established with respect to the wobble signal, for use in detecting the phase inversions. By judging the number of times that the wobble signal is inverted within a fixed unit interval, the "0" and "1" bit states can be discriminated, as illustrated in the example of FIGS. 8A, 8B in which phase modulation of a wobble signal expresses a "0" and a "1" bit, respectively, with the modulation performed in units of 8 periods of the wobble signal. By using two threshold values designated as Vt1, Vt2 respectively for threshold level comparison, the number of phase inversions which occur within a unit interval are detected to thereby obtain a pulse waveform as shown. Based on the time relationship between two of these pulses that occur within a unit interval, a decision is made as to whether a "0" or a "1" bit is expressed in that unit data section.

An alternative method of using a wobble signal has been proposed in Japanese patent Laid-open No. 2001-209937, whereby each of successive unit intervals of the wobble signal is modulated to have either a 0° or 180° phase, in accordance with whether the interval expresses the "1" or the "0" bit state. In the following, such phase modulation intervals of the wobble signal are referred to as unit data sections. During playback of the wobble signal, a sampling clock signal is generated which is locked in phase and frequency with the playback wobble signal, and which is used to generate sampling pulses for use in performing synchronous detection of the wobble signal, i.e., by sampling successive periods of that signal. The resultant sample values that are obtained for a unit data section are successively integrated, to obtain a final value (phase integration value), whose amplitude is indicative of the phase of the wobble signal within that unit data section. In that way, discrimination of the "1" and "0" bit states expressed in the playback wobble signal can be performed based on the levels of the phase integration values obtained for respective unit data sections.

This method is illustrated in the timing diagram example of FIG. 9, in which in addition to the aforementioned sampling pulses, information detection timing pulses are derived from synchronizing information (i.e., a synchronizing pattern) recorded on the optical disk. The information detection timing pulses define respective intervals in which integration is performed of the sample values that are obtained for one unit data section. At the end of each information detection timing pulse, a decision is made as to whether a "0" or a "1" bit is expressed, based on the phase integration output level which has been attained at that time.

In addition to two unit data sections which express the "1" and "0" bit states respectively, the diagram of FIG. 9 shows a reference wobble section of the wobble signal, whose function will be described hereinafter.

However as increasingly high values of recording density are achieved for optical recording media, so that the track pitch is reduced, the signal/noise ratio of the playback signal becomes lowered. Specifically, if phase modulation of the wobble signal is utilized as described above, then as the track pitch is reduced, there is an increasing degree of crosstalk in the playback wobble signal, due to the wobble of adjacent tracks. This results in deterioration of the wobble signal and phase inversions of the wobble signal may also occur, so that the accuracy of synchronous detection of the playback wobble signal is reduced, and the accuracy of demodulation may thereby be reduced.

These problem become more severe if there is any deterioration of the optical recording medium.

It should be noted that such problems are not limited to methods in which modulation is performed by alteration of the phase within respective unit intervals. The waveform diagram of FIG. 9 illustrates a method whereby a fundamental wobble signal frequency has a fixed proportion of a component at twice the fundamental frequency added thereto, or subtracted therefrom, to express the "1" and "0" bit states. However with such a method, crosstalk of the superimposed frequency component having twice the fundamental frequency may occur from adjacent tracks, and result in errors in detection of the "1" and "0" bit states from the playback wobble signal.

In an attempt to reduce this problem, in the case of the phase modulation method illustrated in FIG. 9, sections referred to in the following as reference wobble sections are provided in the recorded wobble, with each reference wobble section immediately preceding a sequence of unit data sections which constitute actual recorded information, such a sequence being referred to in the following as a data wobble sequence. A reference phase integration value is obtained from each reference wobble section in the playback wobble signal, corresponding to a specific predetermined bit state. Thus by comparing each (final) phase integration value that is obtained in the unit data sections of a data wobble sequence with the reference phase integration value of the preceding reference wobble section, it becomes possible to more accurately discriminate between the "1" and "0" bit states.

However it is found in practice that such a countermeasure, in itself, is not sufficient to overcome the above-mentioned problem of insufficient accuracy of demodulating the playback wobble signal, i.e., problems in accurately discriminating between the "1" and "0" bit states expressed in respective unit intervals of the wobble signal, arising from increasing recording density on the optical recording medium. As illustrated in the example of FIG. 9, there is an offset in the level values that are obtained for the reference phase value and for the reference phase values that are obtained in the unit data sections of the data wobble sequence and this, together with the problem of crosstalk that produces distortion of the playback wobble signal and phase inversions in that signal, makes it difficult to achieve accurate demodulation of the information that has been recorded by phase modulation of the wobble.

SUMMARY OF THE INVENTION

It is an objective of the present invention to overcome the above problems of the prior art, by providing a wobble information detection method and apparatus whereby even if there is deterioration of an optical recording medium having the wobble recorded thereon, or distortion and/or phase inversions of a playback wobble signal that is obtained from the optical recording medium, it becomes possible to accurately demodulate the wobble signal by reliably discriminating between "1" and "0" bit states expressed in respective unit data sections of the wobble signal, through use of a phase integration value that is obtained from a reference wobble section of the wobble signal, whereby a data wobble sequence containing data expressed by phase modulation of the wobble signal can be accurately and stably demodulated.

To achieve the above objective, it is a basic feature of the invention that discrimination of the binary value expressed by a unit data section of the wobble signal is based upon whether or not the polarity of a reference phase integration value derived from a reference wobble section is identical to the polarity of a phase integration value that is derived for that unit data section.

More specifically, according to a first aspect, the invention provides a wobble information detection method for an optical recording medium which has synchronizing information recorded at predetermined intervals along a track of the optical recording medium, the track being formed with a wobble which is phase modulated to record information in a plurality of sections including at least one reference wobble section which expresses a predetermined one of two different binary values and a plurality of successive unit data sections constituting a data wobble sequence, each of the unit data sections expressing one of the binary values, with the method comprising steps of performing playback of the optical recording medium to obtain a wobble signal from the wobble of the track, operating on the wobble signal to generate a synchronizing signal that is synchronized with the wobble signal, sampling the wobble signal, using the synchronizing signal, to perform synchronous detection and thereby obtain successive sample values of the wobble signal, detecting the synchronizing information, based on the sample values, defining a series of phase integration intervals, occurring at respective timings determined based on the synchronizing information, initializing a phase integration value to zero, during a phase integration interval within the reference wobble section in the wobble signal, successively incrementing the phase integration value by sample values which are obtained during the phase integration interval, to obtain a reference phase integration value, storing the reference phase integration value, initializing the phase integration value to zero, during each of respective phase integration intervals within the unit data sections of the data wobble sequence, successively incrementing the phase integration value by sample values which are derived during the phase integration interval, to thereby obtain a phase integration value corresponding to each unit data section, and initializing the corresponding phase integration value to zero prior to a phase integration interval of a subsequent one of the unit data sections, for each of the unit data sections, comparing the polarity of the corresponding phase integration value with the polarity of the reference phase integration value, and judging the respective binary values expressed by the unit data sections, based upon results of the comparison.

Alternatively, rather than performing such a polarity comparison operation, the invention provides such a method whereby for each of the unit data sections, the absolute difference value between the reference phase integration value and the above-mentioned corresponding phase integration value obtained for that unit data section is calculated. That absolute difference value is then compared with a predetermined threshold value, and the binary value expressed by that unit data section is then judged based on the results of the threshold value comparison.

The invention further provides a wobble information detection apparatus for detecting wobble information on an optical recording medium which has synchronizing information recorded at predetermined intervals along a track of thereof, the track being formed with a wobble which is phase modulated to record information in a plurality of sections including at least one reference wobble section which expresses a predetermined one of two different binary values and a plurality of successive unit data sections constituting a data wobble sequence, each of the unit data sections expressing one of the binary values, the apparatus including optical pick-up means for producing a wobble signal corresponding to the wobble during playback of the optical recording medium, wherein the apparatus comprises:

synchronizing signal generating means for operating on the wobble signal to generate a synchronizing signal that is synchronized with the wobble signal, synchronous detection means for performing synchronous detection of the wobble signal to thereby obtain successive sample values of the wobble signal, phase integration interval setting means for detecting the synchronizing information, based on the sample values, and for defining a series of phase integration intervals occurring at respective timings that are determined based on the synchronizing information, means for initializing a phase integration value to zero immediately prior to each of the phase integration intervals, memory means for storing a reference phase integration value phase integration means functioning during a phase integration interval within the reference wobble section in the wobble signal to successively increment the phase integration value by sample values which are derived during the phase integration interval, to thereby obtain a reference phase integration value and supply the reference phase integration value to the memory means to be stored therein, and functioning during each of respective phase integration intervals within the unit data sections of the data wobble sequence to successively increment the phase integration value by sample values which are derived during the phase integration interval, for thereby obtaining a phase integration value corresponding to each unit data section, comparator means for comparing respective polarities of the corresponding phase integration values with a polarity of the reference phase integration value, and judgement means for judging respective binary values expressed by the unit data sections, based upon results of the polarity comparisons.

Alternatively, instead of providing such polarity comparator means, such an apparatus may include means for calculating the absolute difference value between each of respective phase integration values obtained for the unit data sections and the reference phase integration value, with each absolute difference value being compared with a fixed threshold value, to thereby discriminate the respective binary values.

DESCRIPTION OF PREFERRED EMBODIMENTS

First Embodiment

Figure 1:
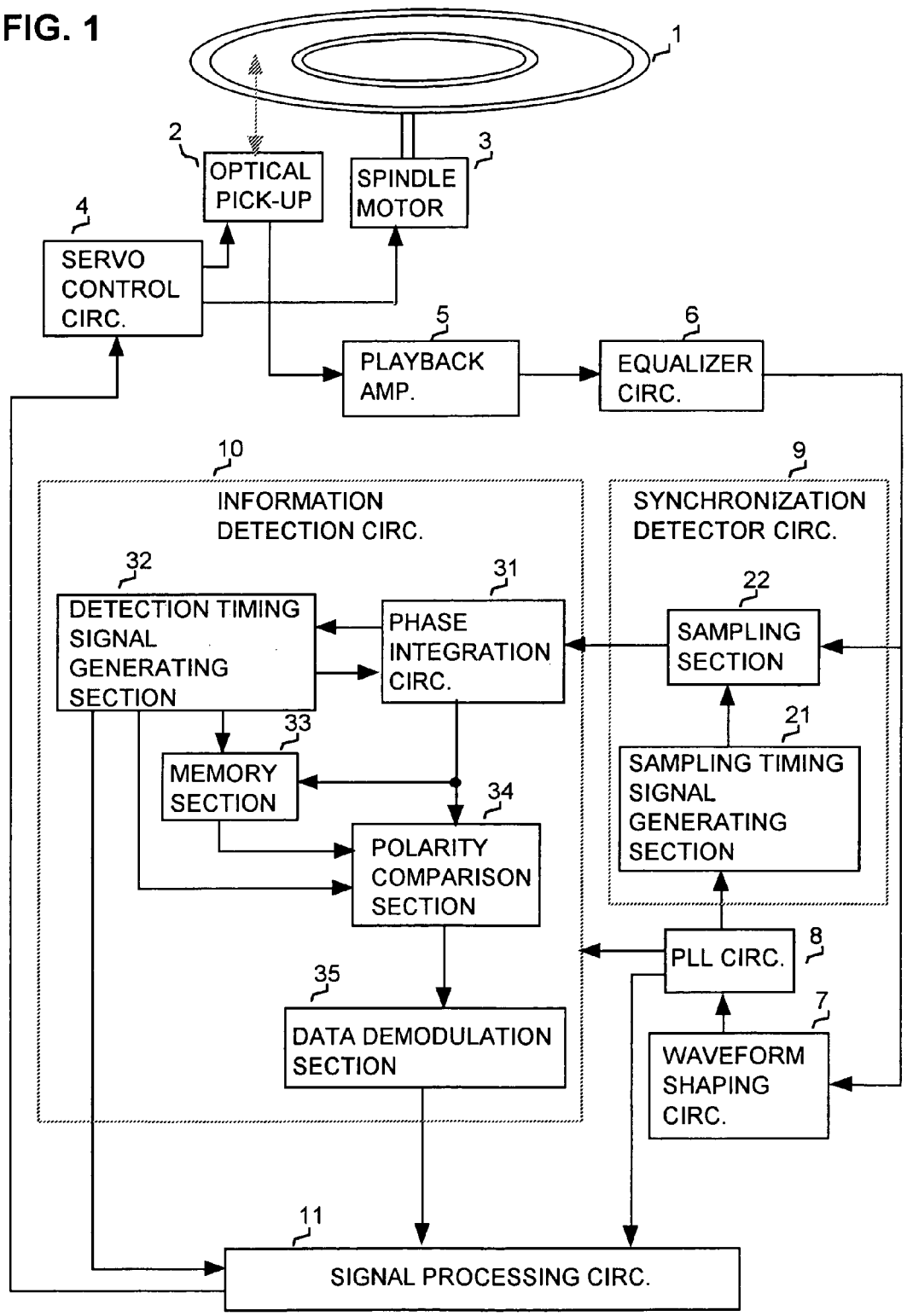
FIG. 1 is a system block diagram of a first embodiment of a wobble information detection apparatus.

FIG. 1 is a block diagram of a first embodiment of an optical disk apparatus which incorporates a wobble information detection apparatus. In FIG. 1, an optical disk 1 has track wobble recorded thereon as described above, the wobble being phase-modulated as sections that express a synchronizing pattern (synchronizing information), reference wobble sections that convey reference wobble information, and data wobble sequences which convey information such as track address information. Numeral 2 denotes an optical pick-up, numeral 4 denotes a disk motor for rotating the optical disk 1, numeral 4 denotes a servo control circuit for controlling driving of the optical pick-up 2 and rotation of the spindle motor 3, numeral 5 denotes a playback amplifier for amplifying an optical readout signal (i.e., the playback wobble signal) from the optical pick-up 2, and numeral 6 denotes an equalizer circuit for reducing code errors caused by waveform distortion of the playback wobble signal from the playback amplifier 5 due to crosstalk. A waveform shaping circuit 7 converts the waveform of the output wobble signal from the equalizer circuit 6 to a pulse signal, and a PLL circuit 8 generates a basic frequency signal that is synchronized with the wobble signal. The PLL circuit 8 can for example utilize a VCO (voltage control oscillator), etc., as is well known.

A synchronous detection circuit 9 performs sampling of the wobble signal, at timings synchronized by an output signal from the PLL circuit 8, to derive successive sample values. An information detection circuit 10 obtains phase integration information from the sample values that are derived by the synchronous detection circuit 9, and uses the phase integration information to obtain information that has been recorded on the optical disk 1 by phase modulation of the wobble (i.e., the contents of the aforementioned data wobble sequences). A signal processing circuit 11 operates on the information derived by the information detection circuit 10 to derive command signals that are supplied to the servo control circuit 4, which applies control of the optical pick-up 2 and spindle motor 3 accordingly.

Figure 2A:
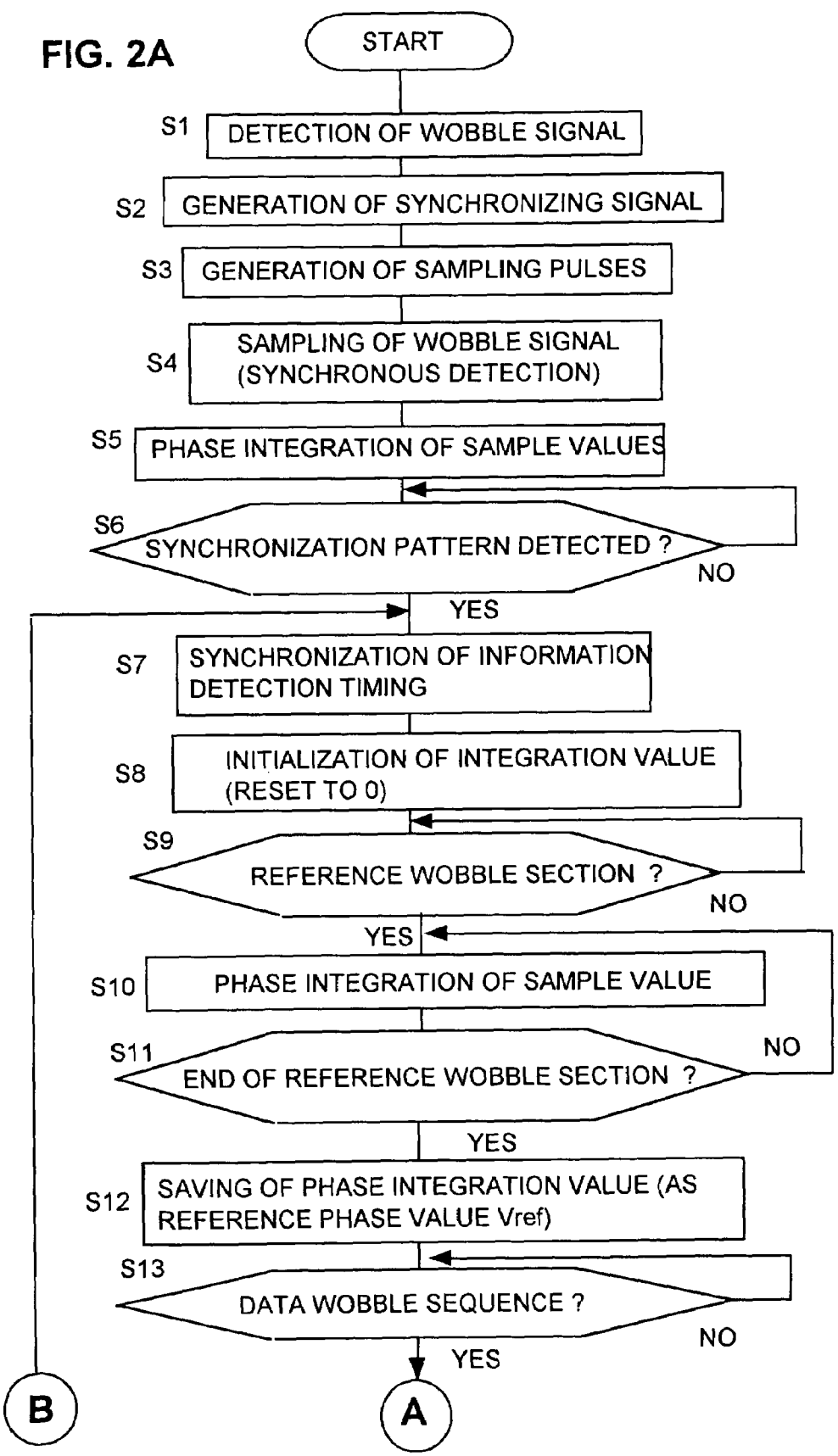
FIGS. 2A, 2B constitute a flow diagram of the operation of the first embodiment.
Figure 2B:
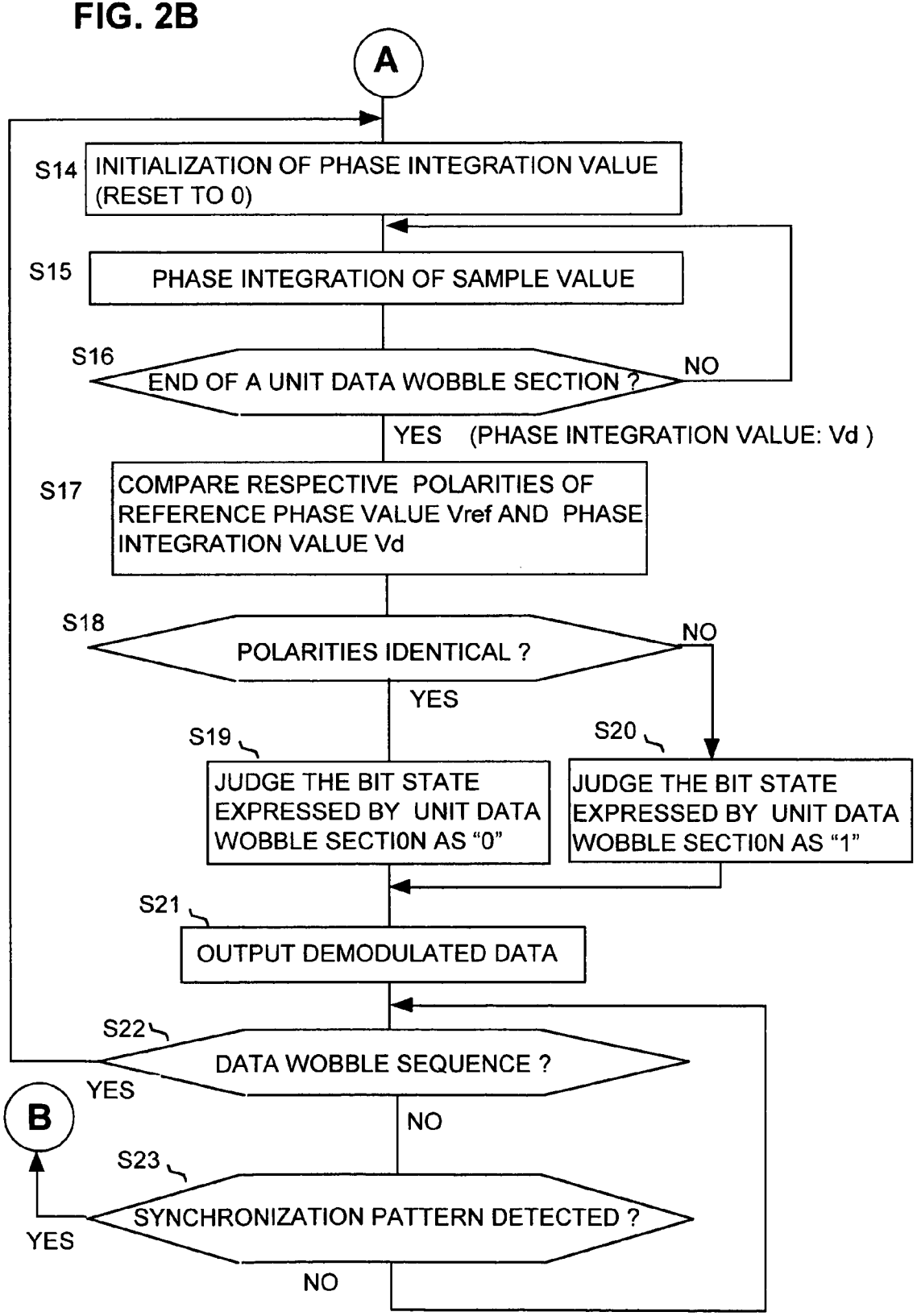
Figure 7:
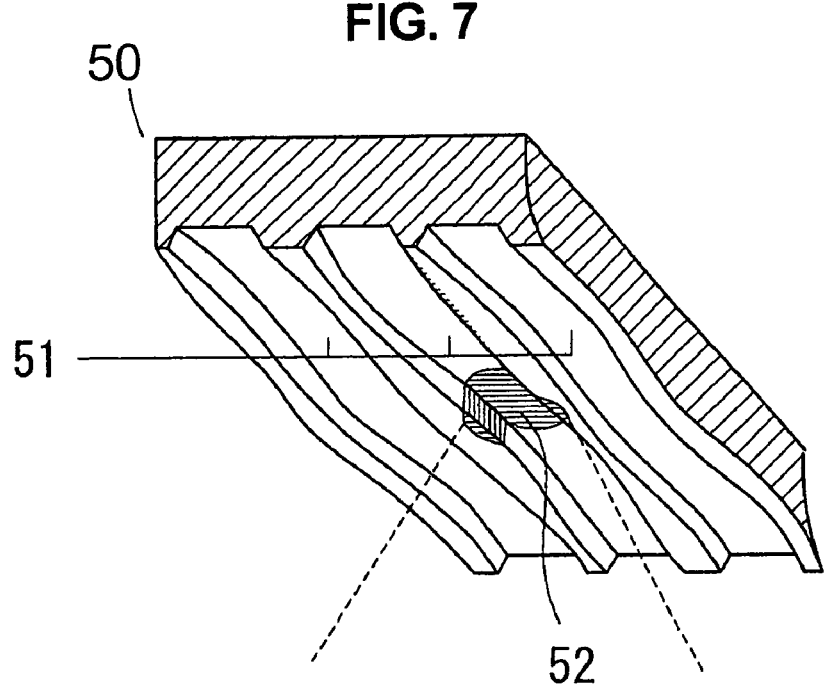
FIG. 7 is a partial view of an optical disk, showing a wobble of a track.
Figure 10:
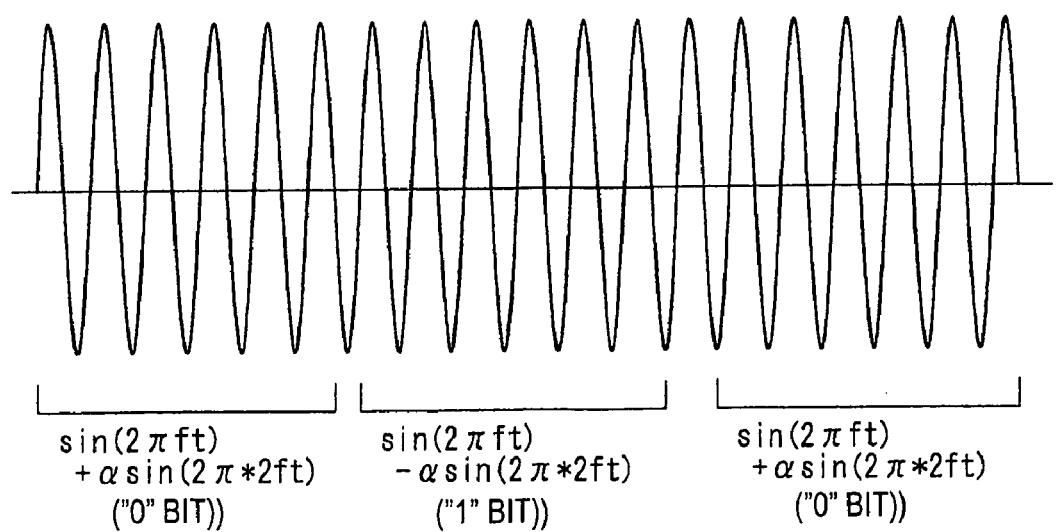
FIGS. 8, 9 and 10 are timing diagrams of prior art methods of wobble information detection.
Figure 8A:
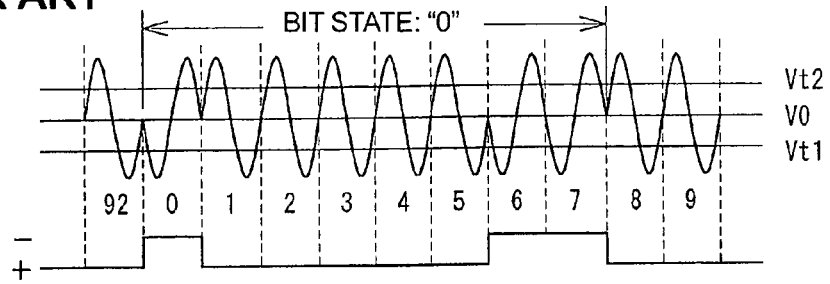
Figure 8B:
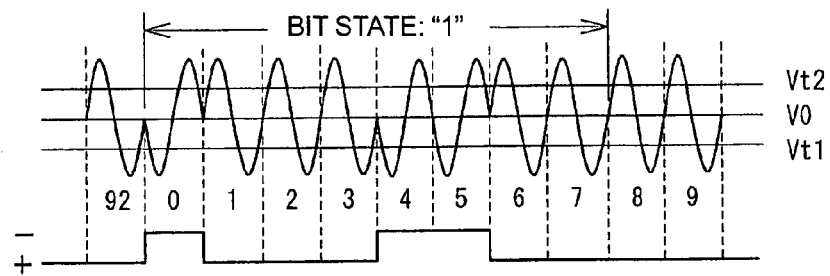
Figure 9:
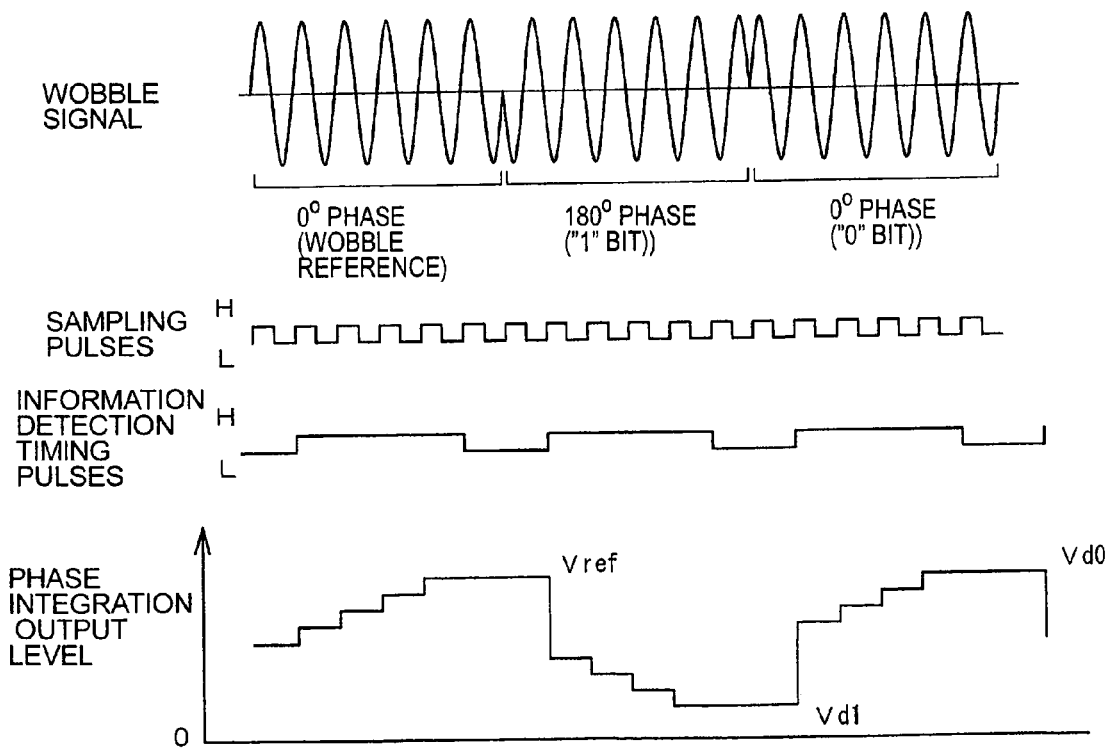

The main features of the present invention reside in the configuration of the information detection circuit 10. These characterizing features will be described in the following, referring first to the flow diagram constituted by FIGS. 2A, 2B showing the operation of the embodiment of FIG. 1, and the timing diagram of FIG. 3. During playback of recorded information from the optical disk 1, as shown in FIG. 7, the light spot 52 is focused on the optical disk 1 and resultant reflected light is converted to a playback signal by the optical pick-up 2, with that signal being amplified by the playback amplifier 5 and processed by the equalizer circuit 6 before being supplied to the synchronous detection circuit 9.

The playback signal is also supplied from the playback amplifier 5 to the waveform shaping circuit 7, to be converted to a pulse waveform signal that is supplied to the PLL circuit 8. The PLL circuit 8 thereby generates a synchronizing signal that is synchronized with the wobble signal (steps S1, S2 in FIGS. 2A, 2B), and supplies that synchronizing signal to the synchronous detection circuit 9, the information detection circuit 10 and the signal processing circuit 11. This synchronizing signal serves as a reference clock signal for the overall system.

In the synchronous detection circuit 9, the sampling timing signal generating circuit 21 uses the synchronizing signal to generate sampling timing pulses for use in synchronous detection, and supplies the sampling timing pulses to the sampling timing signal generating circuit 21 which thereby performs sampling of the playback signal, i.e., synchronous detection (steps S3, S4).

Since the synchronizing signal produced from the PLL circuit 8 is synchronized with the wobble signal, the sample values that are obtained by the sampling section 22 are inherently synchronized with the wobble signal. As described hereinabove, the optical disk 1 has recorded thereon a wobble signal consisting of a synchronizing pattern section, reference wobble section containing reference wobble information, and data wobble sequence conveying data content (e.g., address information, etc.) as a sequence of bits.

Figure 3:
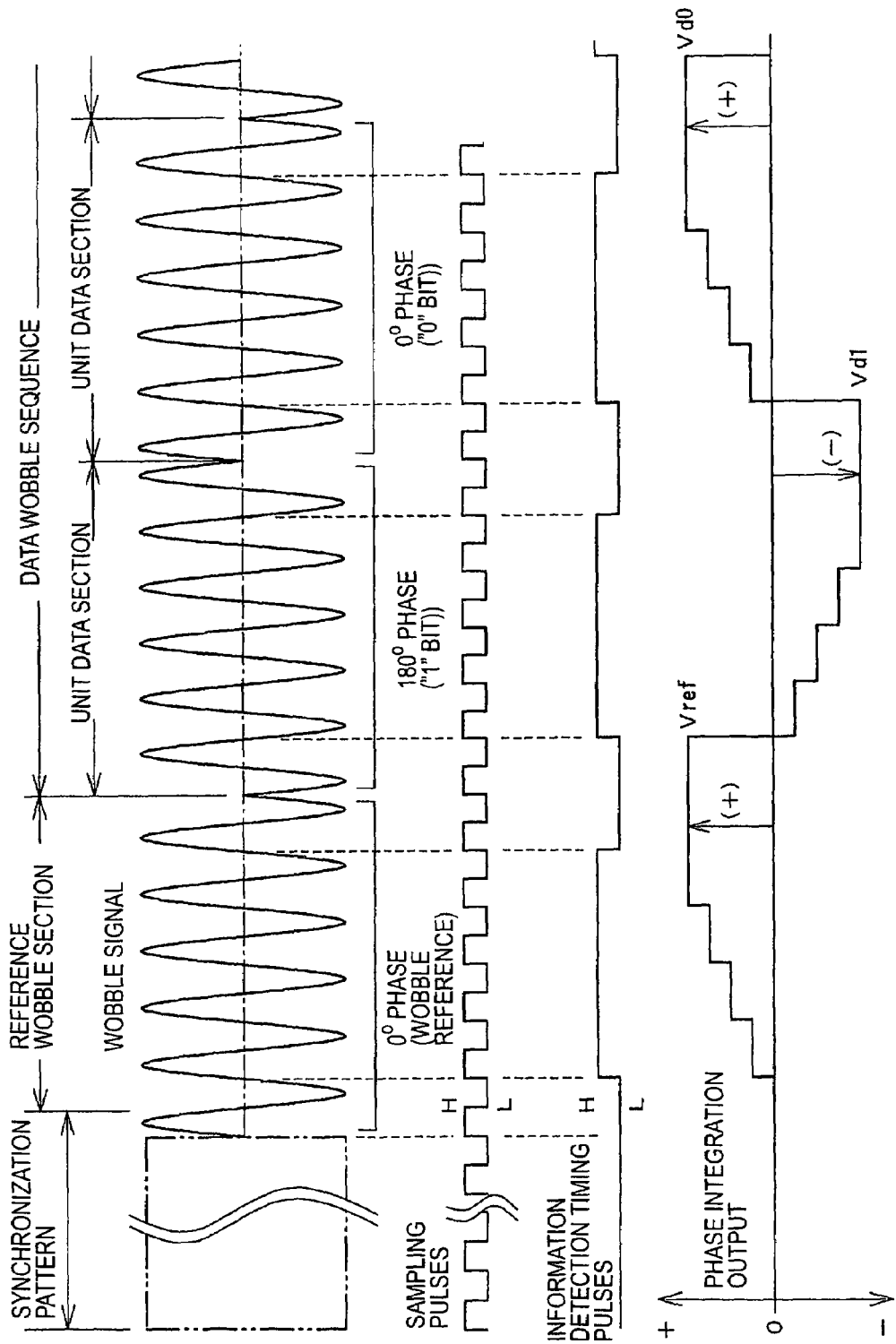
FIG. 3 is a timing diagram of the operation of the first embodiment.

The wobble signal has the waveform shown in FIG. 3. As shown, a synchronizing pattern section is immediately followed by a reference wobble section, which consists of eight periods of the wobble signal and which in this embodiment is assumed to express a reference phase of 0°, with that phase corresponding to the "0" bit state. The reference wobble section is immediately followed by a data wobble sequence as shown.

In the data wobble sequence, each bit is expressed by a section made up of eight periods of the wobble signal in the same way as for the reference wobble section. Each such section of the data wobble sequence will be referred to as a unit data section. With this embodiment, if the phase of the wobble signal within a unit data section of the data wobble sequence is 180°, then that unit data section expresses a "1" bit, while if the phase within a unit data section is 0° then that unit data section expresses a "0" bit.

The information detection circuit 10 receives the sample values obtained by synchronous detection of the wobble signal, from the synchronous detection circuit 9, together with the synchronizing signal from the PLL circuit 8, and a phase integration circuit 31 within the information detection circuit 10 performs integration of the respective phase values of the sample values (step S5), and outputs the resultant phase integration information to a detection timing signal generating section 32.

Within the synchronizing pattern section, the wobble signal is configured such as to result in a pattern of phase integration values (obtained by the phase integration circuit 31) that are different from any phase integration values which can be obtained for the contents of the reference wobble section or any of the unit data sections of the data wobble sequence. The detection timing signal generating section 32 detects the phase integration values of the synchronization pattern, and thereby obtains timing information (i.e., indicative of the timing of the start of the reference wobble section), with that timing information being supplied to the phase integration circuit 31 (S6, S7).

The phase integration circuit 31 utilizes that timing information for synchronization of information detection timing intervals, i.e., respective intervals in each of which phase integration is performed to obtain a phase integration value.

In addition, the detection timing signal generating section 32 supplies an initialization signal to the phase integration circuit 31, whereby the phase integration circuit 31 resets the phase integration value that is produced therefrom to zero (step S8).

Since the reference wobble section immediately follows the synchronization pattern, the phase integration circuit 31 then performs phase integration of the sample values obtained for the reference wobble section (step S9, S10), and generates a first one of a series of information detection timing pulses which define respective phase integration intervals. The information detection timing pulses are synchronized based on the timing information supplied from the detection timing signal generating section 32 in step 7, such that the information detection timing pulse occur respectively within the reference wobble section and each of the unit data sections, in succession. Specifically, an information detection timing pulse is at the high (H) level during the four central periods of each of the sets of six periods of the wobble signal that respectively constitute the reference wobble section and each of the unit data sections. Each H level interval of the information detection timing pulses is preceded and succeeded by an interval at the low (L) level, having a duration of two periods of the wobble signal. It is during each L level period of the information detection timing pulses, and immediately before the first information detection timing pulse, that the phase integration circuit 31 is initialized, to reset the phase integration value to zero as described above.

During each interval in which the information detection timing pulses are at the H level, when a sampling pulse goes to the H level and a sample value is thereby obtained, the phase integration circuit 31 increments the phase integration value with a sample value that is inputted at that time from the synchronous detection circuit 9.

Thus during playback of the reference wobble section shown in FIG. 3, the sampling of the second to fourth periods of the wobble signal will result in four successive positive values, which are integrated to obtain a final phase integration value, i.e., the reference phase integration value Vref as shown (steps S9, S10, S11).

Since the phase integration value is initialized to zero before phase integration using the sample values of the reference wobble section begins, a positive polarity is obtained for the reference phase integration value Vref with the example of FIG. 3, in which the polarity of Vref has been predetermined as corresponding to the "0" bit state.

When the phase integration reference value Vref has been obtained, and the information detection timing pulses then go to the L level, the detection timing signal generating section 32 supplies a write control signal to the memory section 33, whereby the phase integration reference value Vref is stored in the memory section 33 (steps S11, S12).

When the information detection timing pulses then go to the H level after the start of the data wobble sequence, the phase integration circuit 31 is again initialized, so that the phase integration value produced from the phase integration circuit 31 is reset to zero (steps S13, S14).

Thereafter, sampling of the second through fourth periods of the wobble signal in each of the successive unit data sections of the data wobble sequence is performed in the same manner as described for the reference wobble section, i.e., with the phase integration value being reset to zero before phase integration of the sample values of a unit data section begins, with sampling of the wobble signal being executed each time the sampling pulses are at the H level during an interval in which the information detection timing pulses are at the H level within a unit data section, and with the four sample values thereby obtained being integrated to obtain a final phase integration value for that unit data section (steps S15, S16).

In the example of FIG. 3, the unit data section that immediately follows the reference wobble section expresses a "1" state bit, and so the phase of the wobble signal in that unit data section differs by 180° from the phase during the reference wobble section. As a result, the sample values that are obtained in the second to fourth periods of that first unit data section are negative values. These are integrated to obtain the final phase integration value Vd1 for that unit data section, i.e., a negative polarity value, which is temporarily held in the phase integration circuit 31.

At the end of that unit data section, the detection timing signal generating section 32 supplies a comparison command signal to the polarity comparison section 34. The polarity comparison section 34 responds by comparing the polarity of the phase integration value Vd1 with the polarity of the phase reference value Vref that was obtained for the reference wobble section, which is held in the memory section 33 (steps S16, S17).

If these polarities are identical, then the polarity comparison section 34 judges that the bit state expressed by that unit data section is "0". Conversely, if the polarity of the phase integration value Vd1 is opposite to that of Vref, then it is judged that the bit state expressed by that unit data section is "1" (steps S18, S19).

It can thus be understood that with this embodiment, a decision is made as to whether or not the polarity of the phase integration value that is obtained for a unit data section within the data wobble sequence differs from the polarity of the phase reference value, to thereby judge the bit state that is expressed by the phase-modulated wobble signal within that unit data section.

With the example of FIG. 3, the polarity of the reference phase integration value Vref (which is predetermined as corresponding to the "0" bit state) is positive, and since the polarity of the phase integration value obtained for the first unit data section is negative, it is judged that the first unit data section expresses a "1" state bit.

The information which has thereby been obtained by the polarity comparison performed by the polarity comparison section 34 is outputted to the data demodulation circuit 35. The data demodulation circuit 35 responds by supplying information indicative of the "1" or "0" bit state to the signal processing circuit 11, in accordance with the polarity judgement information that has been received (step S21).

As a result, the "1" bit state expressed by the first unit data section is demodulated and supplied to the signal processing circuit 11.

Thereafter, the information detection circuit 10 repetitively executes the above processing for each of the unit data sections of the data wobble sequence (steps S22→S14˜S21).

In the example of FIG. 3, the second unit data section expresses a "0" bit, and so is modulated with the same phase as that of the reference wobble section, i.e., 0°. After the phase integration circuit 31 has been initialized and the phase integration value thereby reset to zero, phase integration is executed during that second unit data section in the same way as for the reference wobble section, by the phase integration circuit 31. As shown in FIG. 3, a final phase integration value having positive polarity, designated as Vd0, is thereby obtained for the second unit data section, so that information indicative of the "0" bit state is supplied to the signal processing circuit 11 as the demodulated output.

Thereafter, if the detection timing signal generating section 32 newly detects a synchronization pattern, then synchronizing of generating the information detection timing pulses based on that synchronization pattern is again performed, as described hereinabove, and the same processing as described above is performed for the next reference wobble section (steps S23→S7˜S21).

In that way, the signal processing circuit 11 assembles a data set as a sequence of demodulated bits that have been supplied from the information detection circuit 10, and thereby obtains information such as address information etc., that is recorded within a data wobble sequence on the optical disk 1.

The address information etc., is outputted from the signal processing circuit 11 to the servo control circuit 4, to be used as drive control information for controlling the optical pick-up 2 and spindle motor 3.

As described above, this embodiment performs synchronous detection using timing information derived from a synchronizing pattern, to obtain successive sample values indicative of respective phase values of the wobble signal, and performs integration of the series of sample values thereby derived during each reference wobble section or unit data section to obtain respective (final) phase integration values. The polarity of the phase integration value thereby obtained for a unit data section is compared with that obtained for the preceding reference wobble section (with the polarity of the phase integration value obtained for a reference wobble section having been predetermined as corresponding to a specific "1" or "0" bit state), to thereby judge the respective bits that are conveyed by the unit data sections of a data wobble sequence.

Such an information detection method, based on comparison of polarities of phase integration values, is less affected by distortion and erroneous phase inversions in the playback wobble signal, by comparison with a prior art method whereby level comparison is performed against values which contain an offset. Furthermore with the above embodiment, reliable discrimination of the "1" or "0" bit states expressed by the respective unit data sections can be achieved, so that more precise and stable detection of the contents of a data wobble sequence, i.e., demodulation of a data wobble sequence, can be achieved.

With the above embodiment, the information detection circuit 10 has been shown in block system form, as having a hardware configuration. However it will be understood that all of the processing functions described can be implemented by software, i.e., by utilizing a microcomputer operating under a suitable control program.

In that case, the microcomputer would be provided with a ROM (read-only memory) having stored therein a program for executing the processing sequence of steps S5 to S23 shown in the flow diagram of FIGS. 2A, 2B, with the CPU of the microcomputer successively executing the program contents.

Furthermore with the above embodiment, a synchronizing pattern and a reference wobble section are successively recorded on the optical disk, followed by a data wobble sequence. However it would be possible for example to also record a synchronization pattern followed by a reference wobble section at one or more positions within a data wobble sequence.

Moreover although the above embodiment has been described for the case in which the synchronization pattern is recorded on the optical disk 1 within the wobble, it would be equally possible record the synchronizing pattern as a sequence of pits.

Second Embodiment

Figure 4:
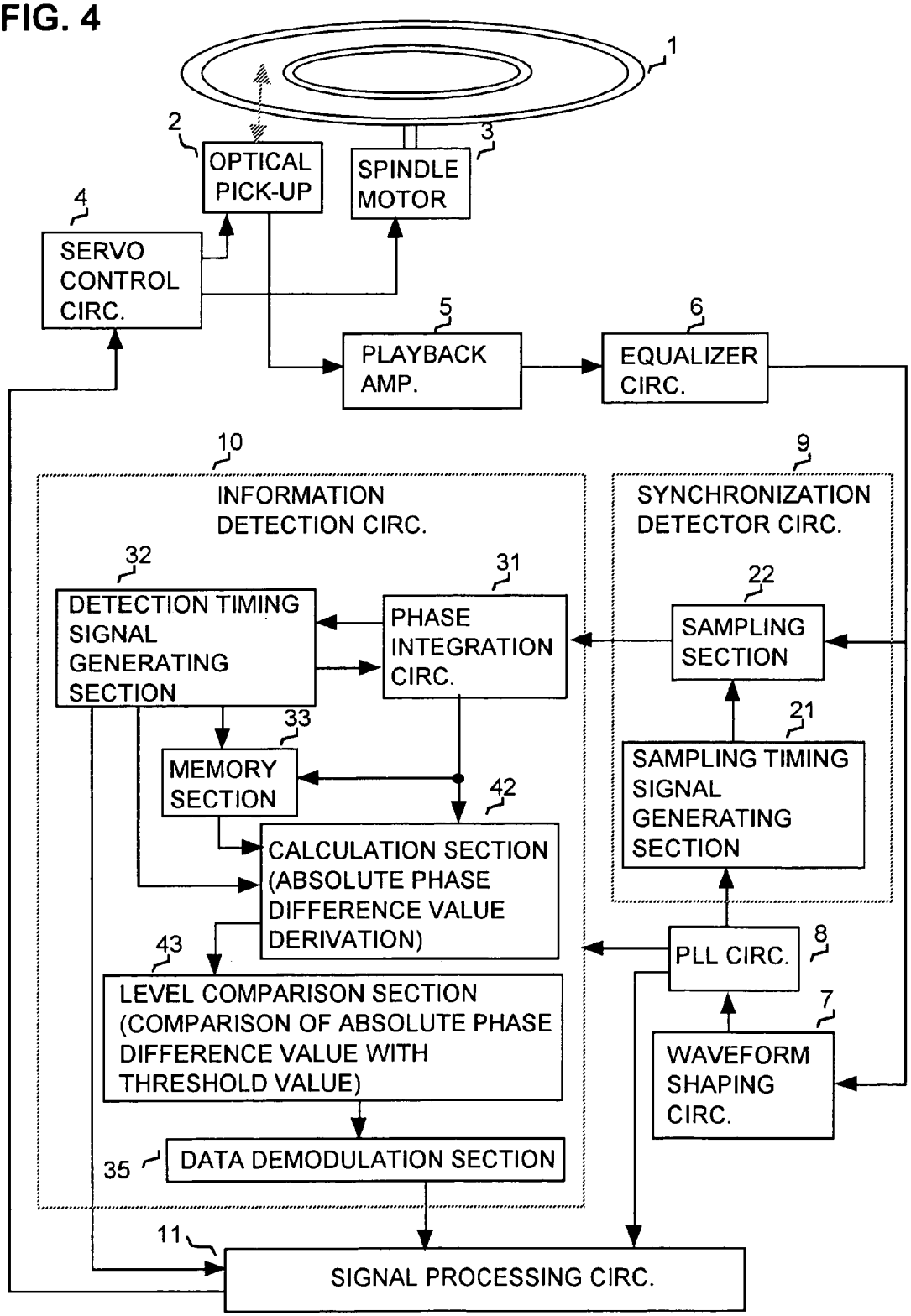
FIG. 4 is a system block diagram of a second embodiment of a wobble information detection apparatus.

FIG. 4 is a block diagram of a second embodiment of an optical disk apparatus which incorporates a wobble information detection apparatus. As can be understood by comparing FIG. 4 with FIG. 1, the second embodiment differs from the first embodiment of FIG. 1 in that the polarity comparison section 34 is replaced by a calculation section 42 and a level comparison section 43, in the information detection circuit 41. Other components of the second embodiment which correspond to components in the embodiment of FIG. 1 are designated by identical reference numerals to those of FIG. 1, and detailed description of these will be omitted. The following description will be limited to mainly the operation of the calculation section 42 and of the level comparison section 43.

Firstly, when sample values of the wobble signal are obtained by the synchronous detection circuit 9 and inputted to the information detection circuit 41 after the synchronization pattern has been detected, so that the information detection timing pulses and sampling pulses are being generated with the requisite synchronized relationship with the wobble signal as described for the first embodiment, the phase integration value is reset to zero at the start of the reference wobble section, then phase integration is performed by the phase integration circuit 31 using the sample values, to establish the reference phase integration value Vref, also as described for the first embodiment (i.e., as in steps S1 to S12 of FIGS. 2A, 2B).

The phase integration value is then again initialized to zero, and thereafter a (final) phase integration value Vd is obtained in each of successive unit data sections in the same manner as described for the first embodiment (i.e., as in steps S13 to S16), with the polarity of each phase integration value Vd being determined in accordance with the bit state that is conveyed by the corresponding unit data section.

Figure 6:
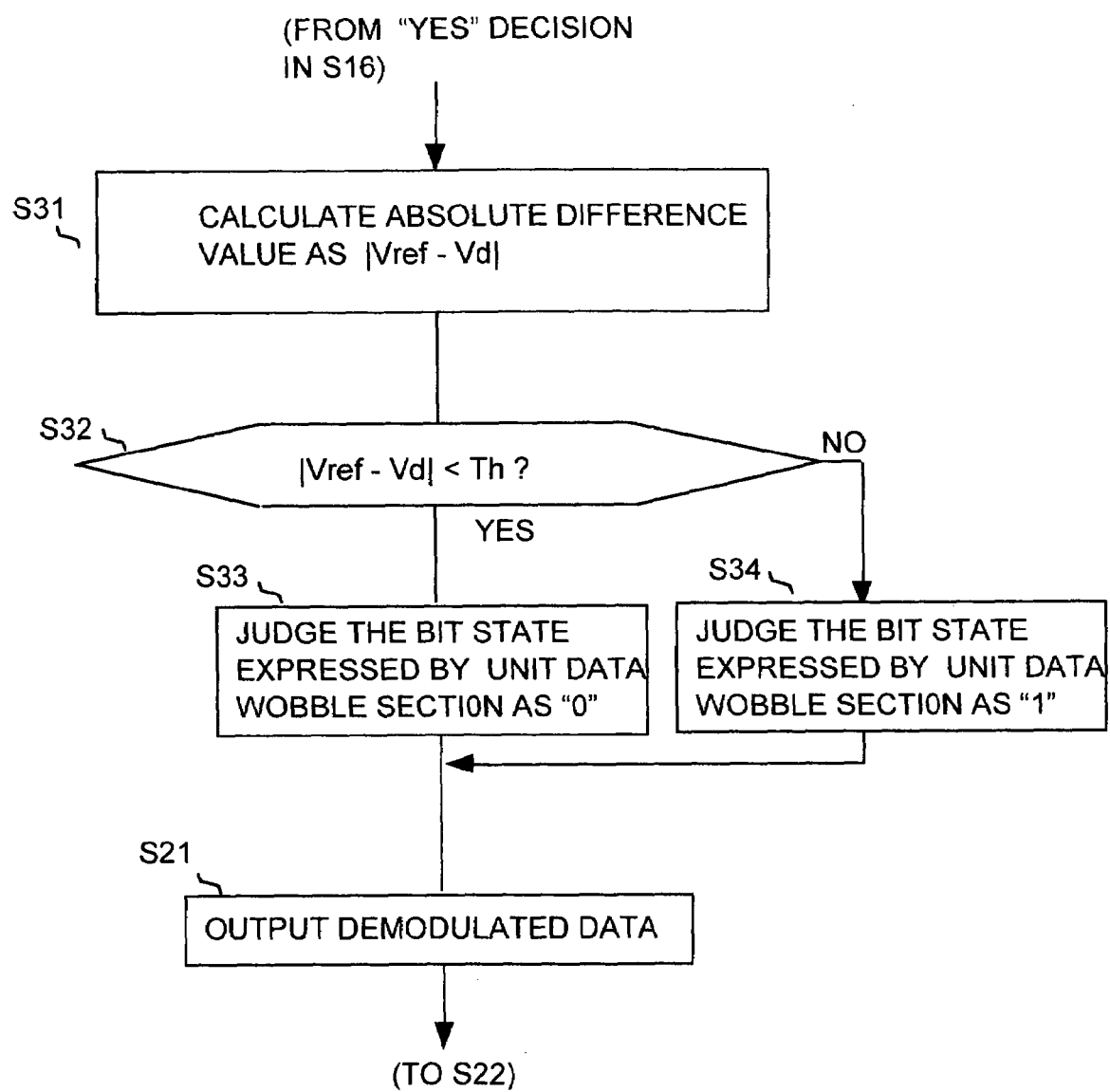
FIG. 6 is a partial flow diagram of the operation of the second embodiment.

The characteristic feature of the second embodiment resides in the way in which the reference phase integration value Vref and the phase integration value Vd obtained for a unit data section are used to discriminate the "1" or "0" bit state that is expressed by that unit data section. The overall processing flow of this embodiment thus differs from that of the first embodiment, shown in FIGS. 2A, 2B described above, only with respect to the judgement operations of steps S17 to S20. FIG. 6 is a partial flow diagram showing this different part of the flow sequence, for the second embodiment.

With the second embodiment, when a phase integration value Vd is obtained for a unit data section, the detection timing signal generating section 32 supplies a command signal to the calculation section 42, whereby the calculation section 42 derives the absolute difference value |Vref−Vd| between that phase integration value Vd and the reference phase integration value Vref (step S31). A predetermined threshold value designated as Th has been set beforehand for the level comparison section 43, which compares the absolute difference value |Vref−Vd| with the threshold value Th. A decision is made as to whether that unit data section expresses a "1" or "0" bit, based on the result of the comparison (steps S32 to S33). The level comparison section 43 then sends information to the data demodulation circuit 35, indicative of the decision result, with the data demodulation circuit 35 operating as described hereinabove for the first embodiment.

Figure 5:
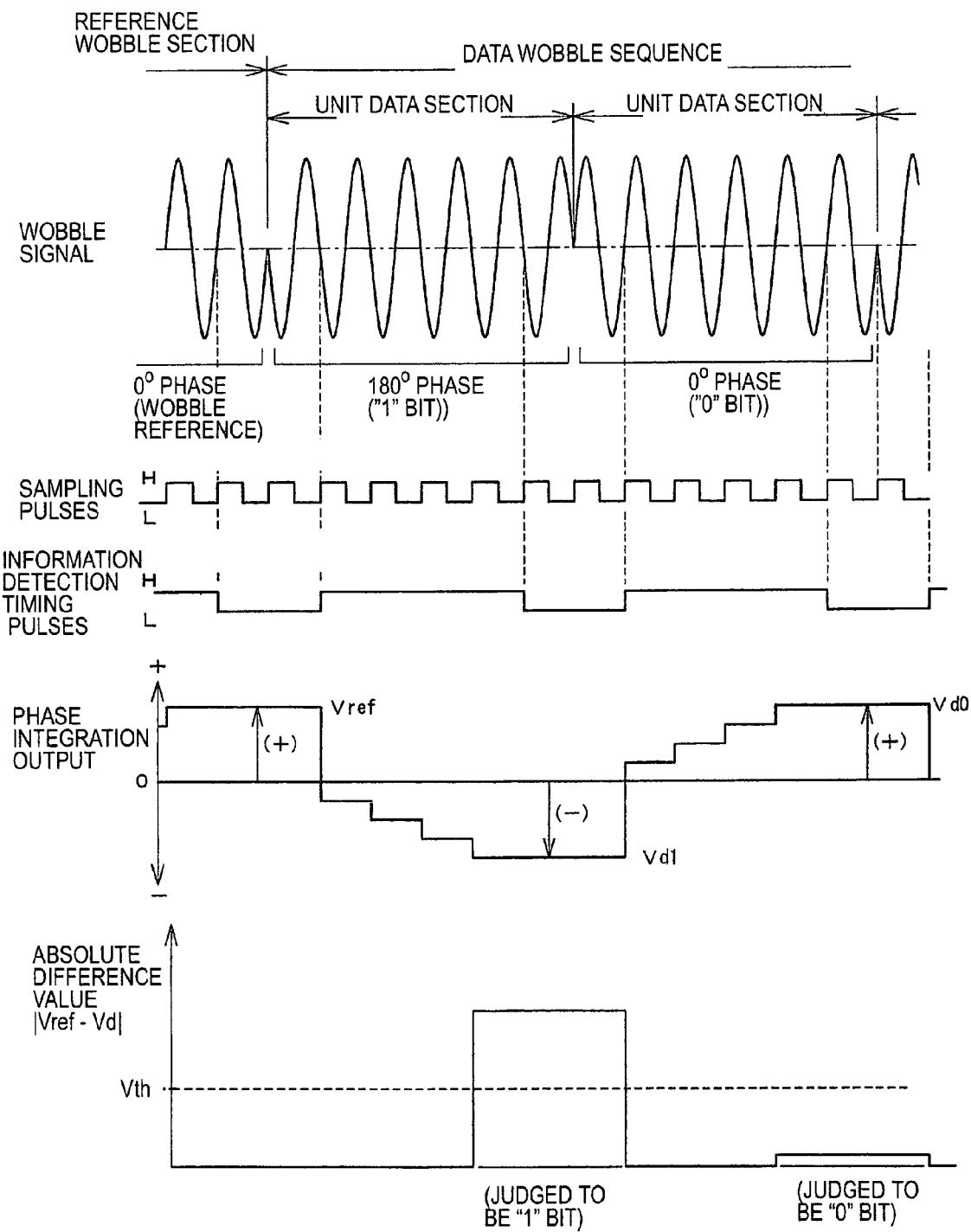
FIG. 5 is a timing diagram of the operation of the second embodiment.

If a reference wobble section and the unit data sections of a data wobble sequence occur in the wobble signal successively as shown in FIG. 3, then the timing relationships between the sampling pulses, the information detection timing pulses and the wobble signal will be similar to that of FIG. 3, as illustrated in the timing diagram example of FIG. 5 for the second embodiment. In that example (in which it is again assumed that the phase of the reference wobble section is 0° and is indicative of the "0" bit state) with the first unit data section following the reference wobble section expressing a "1" bit (so that the corresponding phase integration value Vd1 is negative), the absolute difference value |Vref−Vd1| which is obtained for that first unit data section substantially exceeds the threshold value Vth, as shown, so that it can be accurately judged that a "1" bit is expressed.

Conversely, in the case of a unit data section for which the phase is 0° such as the second unit data section in FIG. 5, the resultant phase integration value Vd0 is positive, so that the corresponding absolute difference value is close to zero and so is substantially lower than the threshold value Vth, and hence it can be accurately judged that this unit data section expresses a "0" bit. The threshold value Vth is preferably set as approximately (½)·|Vref'−Vd'|, to achieve reliable discrimination between the phase integration values expressing the "1" and "0" bit states, where "Vref'" here signifies a typical value that would be obtained for the reference phase integration value, and "Vd'" here signifies a typical (final) phase integration value that would be obtained for a unit data section and which is of opposite polarity to Vref.

In that way, accurate discrimination of the "1" and "0" bit states expressed by the respective unit data sections can be achieved even if phase inversion of the wobble signal occurs.

In other respects, the operation and advantages of this embodiment are similar to those of the first embodiment described above. However due to the large amount of difference between the levels which are judged for the purpose of discriminating between the "1" or "0" bit states with the second embodiment, more reliable discrimination can be achieved than for the first embodiment.

With the second embodiment, as for the first embodiment, each synchronizing pattern is shown as being recorded in the wobble signal, immediately preceding a reference wobble section, with information detection timing pulses subsequently being generated based on the timing of detection of that synchronization pattern. However it would be equally possible to record the synchronization patterns as pits, along a track, with the reference wobble sections being located at fixed positions in relation to these pits. In that case, synchronizing of the information detection timing pulses and detection of the reference wobble sections could be performed based on the synchronizing information obtained from these pits. When the start of a reference wobble section is thereby detected, phase integration of that reference wobble section, and of each of the unit data sections of the succeeding data wobble sequence, would then be performed in the same manner as described for the above embodiments.

It should thus be understood that although the invention has been described in the above referring to specific embodiments, various modifications to these could be envisaged, which fall within the scope claimed for the invention in the appended claims.

What is claimed is:

1. A wobble information detection method for an optical recording medium having synchronizing information recorded at predetermined intervals along a track of said optical recording medium, said track being formed with a wobble which is phase modulated to record information in a plurality of sections including at least one reference wobble section which expresses a predetermined one of two different binary values and a plurality of successive unit data sections constituting a data wobble sequence, each of said unit data sections expressing one of said binary values, wherein said method comprises steps of:

performing playback of said optical recording medium to obtain a wobble signal from said wobble of said track;

operating on said wobble signal to generate a synchronizing signal that is synchronized with said wobble signal;

sampling said wobble signal, using said synchronizing signal, to perform synchronous detection and thereby obtain successive sample values of said wobble signal;

detecting said synchronizing information, based on said sample values;

defining a series of phase integration intervals, occurring at respective timings determined based on said synchronizing information;

initializing a phase integration value to zero immediately prior to a phase integration interval within said reference wobble section in said wobble signal and successively incrementing said phase integration value by sample values which are obtained during said phase integration interval, to obtain a reference phase integration value;

storing said reference phase integration value;

initializing said phase integration value to zero immediately prior to each of respective phase integration intervals within said unit data sections of said data wobble sequence and successively incrementing said phase integration value by sample values which are derived during said each phase integration interval, to thereby obtain a phase integration value corresponding to said each unit data section;

for each said unit data section, comparing a polarity of said corresponding phase integration value with a polarity of said reference phase integration value1; and judging a binary value expressed by said each unit data section, based upon results of said comparison.

2. A wobble information detection apparatus for detecting wobble information on an optical recording medium having synchronizing information recorded at predetermined intervals along a track of said optical recording medium, said track being formed with a wobble which is phase modulated to record information in a plurality of sections including at least one reference wobble section which expresses a predetermined one of two different binary values and a plurality of successive unit data sections constituting a data wobble sequence, each of said unit data sections expressing one of said binary values, said apparatus including optical pick-up means for producing a wobble signal corresponding to said wobble during playback of said optical recording medium;

wherein said apparatus comprises:

synchronizing signal generating means for operating on said wobble signal to generate a synchronizing signal that is synchronized with said wobble signal;

synchronous detection means for performing synchronous detection of said wobble signal to thereby obtain successive sample values of said wobble signal, phase integration interval setting means for detecting said synchronizing information, based on said sample values, and for defining a series of phase integration intervals occurring at respective timings that are determined based on said synchronizing information;

means for initializing a phase integration value to zero immediately prior to each of said phase integration intervals;

memory means for storing a reference phase integration value;

phase integration means functioning during a phase integration interval within said reference wobble section in said wobble signal to successively increment said phase integration value by sample values which are derived during said phase integration interval, to thereby obtain said reference phase integration value and supply said reference phase integration value to said memory means to be stored therein, and functioning during each of respective phase integration intervals within said unit data sections of said data wobble sequence to successively increment said phase integration value by sample values which are derived during said phase integration interval, for thereby obtaining a phase integration value corresponding to said each unit data section;

comparator means for comparing respective polarities of said corresponding phase integration values with a polarity of said reference phase integration value; and judgement means for judging respective binary values expressed by said unit data sections, based upon results of said polarity comparisons.

3. A wobble information detection method for an optical recording medium having synchronizing information recorded at predetermined intervals along a track of said optical recording medium, said track being formed with a wobble which is phase modulated to record information in a plurality of sections including at least one reference wobble section which expresses a predetermined one of two different binary values and a plurality of successive unit data sections constituting a data wobble sequence, each of said unit data sections expressing one of said binary values, wherein said method comprises steps of:

performing playback of said optical recording medium to obtain a wobble signal from said wobble of said track;

operating on said wobble signal to generate a synchronizing signal that is synchronized with said wobble signal;

sampling said wobble signal, using said synchronizing signal, to perform synchronous detection and thereby obtain successive sample values of said wobble signal;

detecting said synchronizing information, based on said sample values;

defining a series of phase integration intervals, occurring at respective timings determined based on said synchronizing information;

initializing a phase integration value to zero immediately prior to a phase integration interval within said reference wobble section in said wobble signal and successively incrementing said phase integration value by sample values which are obtained during said phase integration interval, to obtain a reference phase integration value;

storing said reference phase integration value;

initializing said phase integration value to zero immediately prior to each of respective phase integration intervals within said unit data sections of said data wobble sequence and successively incrementing said phase integration value by sample values which are derived during said each phase integration interval, to thereby obtain a phase integration value corresponding to said each unit data section;

for each said unit data section, calculating an absolute value of difference between said corresponding phase integration value and said reference phase integration value;

comparing said absolute difference value with a predetermined threshold value; and judging a binary value expressed by said each unit data section, based upon results of said comparison.

4. A wobble information detection apparatus for detecting wobble information on an optical recording medium having synchronizing information recorded at predetermined intervals along a track of said optical recording medium, said track being formed with a wobble which is phase modulated to record information in a plurality of sections including at least one reference wobble section which expresses a predetermined one of two different binary values and a plurality of successive unit data sections constituting a data wobble sequence, each of said unit data sections expressing one of said binary values, said apparatus including optical pick-up means for producing a wobble signal corresponding to said wobble during playback of said optical recording medium;

wherein said apparatus comprises:

synchronizing signal generating means for operating on said wobble signal to generate a synchronizing signal that is synchronized with said wobble signal;

synchronous detection means for performing synchronous detection of said wobble signal to thereby obtain successive sample values of said wobble signal, phase integration interval setting means for detecting said synchronizing information, based on said sample values, and for defining a series of phase integration intervals occurring at respective timings that are determined based on said synchronizing information;

means for initializing a phase integration value to zero immediately prior to each of said phase integration intervals;

memory means for storing a reference phase integration value;

phase integration means functioning during a phase integration interval within said reference wobble section in said wobble signal to successively increment said phase integration value by sample values which are derived during said phase integration interval, to thereby obtain said reference phase integration value and supply said reference phase integration value to said memory means to be stored therein, and functioning during each of respective phase integration intervals within said unit data sections of said data wobble sequence to successively increment said phase integration value by sample values which are derived during said phase integration interval, for thereby obtaining a phase integration value corresponding to said each unit data section;

absolute difference value calculation means for calculating, for each of said unit data sections, an absolute difference value between said reference phase integration value and said corresponding phase integration value;

comparator means for comparing each of said absolute difference values with a predetermined threshold value; and judgement means for judging respective binary values expressed by said unit data sections, based upon results of said threshold value comparisons.

\* \* \* \* \*